United States Patent Office 3,152,884
Patented Oct. 13, 1964

3,152,884
HERBICIDAL COMPOSITION AND METHOD
Alan J. Lemin, Richland Township, Kalamazoo County, and Arnolds Steinhards and George Swank, Kalamazoo, Mich., assignors to The Upjohn Company, Kalamazoo, Mich., a corporation of Delaware
No Drawing. Filed Apr. 24, 1961, Ser. No. 104,804
9 Claims. (Cl. 71—2.6)

This invention pertains to novel compositions of matter and a process. More particularly, the invention is directed to herbicidal compositions comprising an essential active ingredient component consisting of N,N-disubstituted-$\alpha,\alpha$-diphenylacetamide and 2,2-dichloropropionic acid. Likewise, the invention is directed to the process for controlling undesired plants with said compositions.

The problem of weed damage to field crops is as ancient as agriculture itself, and in recent years increased labor costs have stimulated investigation of other than mechanical methods for controlling weeds. Weeds damage field crops, pastures, and hayfields, and reduce productivity by competing with the crop and forage plants for mineral nutrients, nitrogen, water, and sunlight. In addition to economic damage to field crops, pastures, and hayfields, weeds such as dandelions and crab-grass frustrate the establishment and maintenance of uniform turfs on home lawns and golf courses, and water weeds such as cattails and canary-grass obstruct drainage and irrigation ditches. Among the methods for combatting weeds that have been tried, selective chemical inhibition appears to hold promise of being efficacious and economical, and a great many chemical herbicides have been contrived.

An object of this invention is to provide compositions for controlling undesired plants. Another object of the invention is to provide herbicidal compositions of enhanced activity for preventing the germination of undesired plant seeds and for controlling the growth of noxious weeds in field crops, pastures, turfs, ditches, railroad rights-of-way, and other areas where weed control is desired. A further object of the invention is to provide herbicidal compositions comprising an essential active ingredient component consisting of N,N-disubstituted-$\alpha,\alpha$-diphenylacetamide and 2,2-dichloropropionic acid which cooperate in the presence of each other for improved control of noxious weeds such as Johnson-grass, crab-grass, pigweed, quack-grass, wild oats, foxtails, mustards, purslane, lamb's quarters, sheep sorrel, and like noxious weeds in crops such as cereal grains, cotton, peanuts, beans, and strawberries, in turfs, and other areas.

The foregoing objectives have been achieved, since it has now been found in accordance with the invention that herbicidal compositions containing 2,2-dichloropropionic acid and N,N-disubstituted-$\alpha,\alpha$-diphenylacetamide, as associated active ingredients, are more effective against weeds than either active ingredient used alone.

The N,N-disubstituted-$\alpha,\alpha$-diphenylacetamide active ingredient of the compositions is a newly discovered herbicide represented by the formula

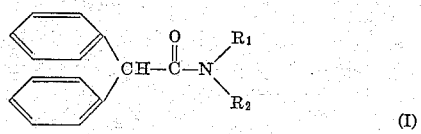

wherein $R_1$ and $R_2$ are selected from the class consisting of alkyl of from 1 to 3 carbon atoms, inclusive, i.e., methyl, ethyl, propyl, and isopropyl; and alkenyl of from 3 to 4 carbon atoms, inclusive, i.e., allyl, methallyl, 3-butenyl, and crotyl. Thus, the N,N-disubstituted-$\alpha,\alpha$-diphenyl acetamides include both N,N-dialkyl- and N,N-dialkenyl-$\alpha,\alpha$-diphenylacetamides.

N,N-dialkyl-$\alpha,\alpha$-diphenylacetamides (compounds of Formula I wherein $R_1$ and $R_2$ are alkyl) are known compounds, and they can be readily prepared by heating diphenylacetic acid with thionyl chloride to form diphenylacetyl chloride; and then forming the amides by reacting the diphenylacetyl chloride with an excess of a secondary amine, e.g., dimethylamine, diethylamine, dipropylamine, and diisopropylamine. Similarly, the novel N,N-dialkenyl-$\alpha,\alpha$-diphenylacetamides are readily prepared by reaction between a diphenylacetyl halide, e.g., diphenylacetyl chloride, and the desired dialkenylamine [e.g., dimethallylamine and N-methallylcrotylamine (Tamele et al., Ind. Eng. Chem. 33, 115–120, 1941), di-3-butenylamine (Reppe et al., Ann. 596, 80–158, 1955), dicrotylamine (Berthold, Chem. Ber. 90, 2743–2747, 1957), and diallylamine] in the presence of an inert organic solvent. Suitable inert organic solvents include benzene, diethyl ether, dioxane, and toluene. Stoichiometrically, the reaction requires one mole of amine for each mole of acid halide. However, the reaction releases one mole of hydrogen chloride; so an excess of amine, preferably at least one mole excess should be provided. In lieu of an excess of amine, another suitable acid acceptor, for example, triethylamine, pyridine, picoline, sodium hydroxide, and the like can be utilized. The reaction can be carried out at temperatures in the range of 0° C. to about 100° C. or up to the reflux temperature of the solvent. The N,N-dialkenyl-$\alpha,\alpha$-diphenylacetamide product is recovered by conventional methods, for example, filtering, washing to remove amine salts, and recrystallization.

The 2,2-dichloropropionic acid active ingredient is a known herbicide. It can be employed in the compositions of the invention in any of its herbicidally effective forms, for example, the free acid, the amide, the metal, ammonium, and amine salts, and the esters. The metal salts include alkali metal, e.g., sodium, potassium, and lithium salts; alkaline earth metal, e.g., calcium, barium, and magnesium salts; and heavy metal, e.g., copper, nickel, iron, and zinc salts. The amine salts include, e.g., mono-, di-, and triethanolamine, triethylamine, isopropanolamine, isopropylamine, and like amine salts. The esters include, e.g., methyl, ethyl, isopropyl, butyl, amyl, and like esters.

The herbicidal compositions according to the invention include solutions, emulsions, suspensions, dispersible powders, emulsifiable concentrates, granular formulations, and dusts. All of these compositions comprise an essential active ingredient component consisting of 2,2-dichloropropionic acid and N,N-disubstituted-$\alpha,\alpha$-diphenylacetamide in dispersed or readily dispersible form and a carrier, with or without adjuvants. In general, selective inhibition of undesired weed species in the presence of field crops, or in turf is obtained by employing a phytonomic carrier, that is to say, a carrier which can be applied to plants without phytotoxicity or other adverse effects. On the other hand, when general herbicidal activity is desired, a phytotoxic carrier, for example, high boiling mineral oil fractions or chlorohydrocarbons can be used.

Even though it is known that 2,2-dichloropropionic acid is an effective herbicide, it was quite unexpected to discover that the combination with N,N-disubstituted-$\alpha,\alpha$-diphenylacetamide in a herbicidal composition produces more effective control of weeds at lower rates of application than either active ingredient alone. Thus these compounds cooperate in the presence of each other to effect a kill of weeds more efficiently than when either compound is applied alone. The result is a potentiation of herbicidal activity in the combination.

The potentiation of herbicidal activity is observed over a wide range of proportions of the active ingredients. Hence, the essential active ingredient component of the compositions of the invention can vary from about 10% to about 90% of 2,2-dichloropropionic acid and correspondingly from about 90% to about 10% of the N,N-disubstituted-α,α-diphenylacetamide. Preferably, the proportions are from about 25% to about 75% of one and, correspondingly, about 75% to about 25% of the other.

The compositions of the invention can be applied at relatively low rates per acre for preventing the germination of seeds and controlling the growth of plants. The compositions give complete or substantially complete suppression of crabgrass, foxtails, Johnson-grass, pigweed, quack-grass, mustard, ragweed, dandelion, wild carrot, and purslane with little or no phytotoxic effect on field crop plants such as corn, wheat, rye, soybeans, and peanuts and desirable turf grasses. In general, the compositions are applied so that the essential active ingredient component is present in concentrations of from 100 p.p.m. (parts per million) to 30,000 p.p.m., preferably 700 to 12,000 p.p.m., at the rate of 0.25 to 4 lbs. per acre. It will be understood, of course, that a choice of concentration of essential active ingredient component depends upon the method of application as well as the type of composition and the degree of herbicidal control desired. In general, concentration is not critical within the range indicated since an effective quantity of essential active ingredient component can be applied to a given area by using greater quantities of a low concentration than of a higher concentration. The concentration of essential active ingredient component in the dispersible powder and emulsifiable concentrates from which the aqueous compositions are prepared can be as high as 99.5% by weight. The concentration of essential active ingredient component in the dusts and granular formulations of the invention can vary from about 0.25% to about 80% or more, but advantageously is of the order of about 0.50% to 20%.

The granular formulations of this invention are prepared with about 0.25% to about 80%, preferably 0.50% to 20% by weight, of the active ingredients and a granular carrier, for example, vermiculite, pyrophyllite, and attapulgite. The active ingredients can be dissolved in a volatile solvent such as ethylene dichloride, methylene chloride, acetone, methanol, and the like, and sprayed on the granular carrier as it is mixed and tumbled. The granules are then dried. The granular carrier can range in particle size from about 10 to about 60 mesh, preferably about 20 to 40 mesh.

The herbicidal dust compositions of the invention are prepared by intimate admixture of from about 0.25% to about 80% by weight, preferably 0.50% to 20% of the active ingredients, with a solid pulverulent carrier which maintains the composition in a dry, free-flowing state. The herbicidal dusts of the invention can be prepared by admixing the N,N-disubstituted-α,α-diphenylacetamide and 2,2-dichloropropionic acid with a solid diluent and then milling. Preferably, however, the active ingredients are dissolved in a volatile organic solvent, of the kinds indicated above, and then sprayed on the solid carrier so as to assure thorough distribution. The mixture is then dried and milled to the desired size, e.g., less than about 60 microns.

Solid carriers that can be used in the dust compositions of the invention include the natural clays such as china clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the compositions also include solid, compounded fertilizers. Such solid compositions can be applied to soil in the form of dusts by the use of conventional machinery.

Dispersible powders are prepared by incorporating a surfactant in a dust composition prepared as described above. Such a dispersible powder can be dispersed in water to any desired concentration and applied to soil by conventional spray equipment. Conveniently, the dispersible powders are formulated with concentrations of the active ingredients up to about 80%, preferably about 10% to 60% by weight. Surfactants useful in preparing such dispersible powder compositions include alkyl sulfates and sulfonates, alkylarylsulfonates, sulfosuccinate esters, polyoxyethylene sulfates, polyoxyethylene-sorbitan monolaurate, alkylarylpolyether sulfates, alkylarylpolyether alcohols, alkylnaphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H–77), blends of polyoxyethylene ethers and oil-soluble sulfonates (Emcol H–400), blends of alkylarylsulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkylarylsulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredients. The resulting formulation has the following percentage composition (parts herein are by weight unless otherwise specified):

| | Percent |
|---|---|
| Active ingredients | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) of essential active ingredient component which can be applied to soil, undesired vegetation, or turf at the rate of 40 gals. per acre to give a total application of active ingredients of 1 lb. per acre.

Emulsifiable concentrates in accordance with the invention are prepared by dissolving the active ingredients (e.g., an N,N-disubstituted-α,α-diphenylacetamide and an ester or amine salt of 2,2-dichloropropionic acid) and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol and the like can be included with the solvent carrier in order to enhance the solubility of the active ingredients. Aqueous emulsions are then prepared by mixing with water to give any desired concentration of active ingredients. The surfactants which can be employed in the aqueous emulsions of the invention are those types noted above. Mixtures of surfactants can be employed if desired.

Advantageously, the concentration of essential active ingredient component in the emulsifiable concentrates can range from about 5% to about 50% by weight, preferably from about 10% to 40%. A concentrate comprising 20% (by weight) of active ingredients dissolved in a water-immiscible solvent of the kind noted above can be admixed with an aqueous medium in the proportions of about 13 ml. of concentrate with 1 gal. of medium to give a mixture containing about 700 parts of active ingredients per million parts of liquid carrier. Similarly, 1 qt. of a 20% concentrate mixed with 40 gals. of water provides about 1200 p.p.m. of active ingredients. In the same manner, more concentrated solutions of active ingredients can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium lignosulfonate, and the like.

The rates of application to areas of soil, undesired vegetation, or turfs to be protected from noxious weeds will depend upon the species of plants to be controlled, the presence or absence of desirable species, the season of year at which treatment is undertaken, and the method and efficiency of application. In general, selective herbicidal activity is obtained when the essential active ingredient component is applied at the rate of about 0.125 to about 50 lbs. per acre, preferably at the rate of 0.25 to 25 lbs. per acre.

The compositions containing 2,2-dichloropropionic acid and N,N-disubstituted-$\alpha,\alpha$-diphenylacetamides according to the invention, can be applied to vegetation and interfused with soil by conventional methods. For example, an area of soil can be treated prior to or after seeding by spreading a granular formulation in accordance with the invention on the plant growth medium with or without mixing. For home lawn application, a conventional hand propelled spreader is satisfactory. Dispersible powder suspensions, emulsions, or solutions can be sprayed from boom-type power sprayers or from hand-operated knapsack sprayers. Dusts can be applied by power dusters, or by hand-operated dusters. Dusts and granular formulaitons can also be applied at the time of seeding in bands spanning the seeded rows.

The term "soil" is employed in the present specification and claims in its broadest sense. Hence the term "soil" refers to a material in which plants can take root and grow, and includes not only earth but compost, manure, muck, humus, sand, and the like.

The following examples are illustrative of the process and products of the present invention, but are not to be construed as limiting.

*Example 1*

An emulsifiable concentrate having the following percentage composition:

| | Percent |
|---|---|
| N,N-dimethyl-$\alpha,\alpha$-diphenylacetamide | 10 |
| 2,2-dichloropropionic acid | 30 |
| Technical alkyl naphthalene boiling at 238° to 293° C. (Velsicol AR-50) | 13.7 |
| Xylene | 12.3 |
| Isopropanol | 11.3 |
| Ethylene dichloride | 17.7 |
| Blend of alkylarylsulfonates and alkylphenoxy polyethoxy ethanols (Triton X-151) | 5.0 | was prepared by mixing 10 lbs. of N,N-dimethyl-$\alpha,\alpha$-diphenylacetamide, 30 lbs. of 2,2-dichloropropionic acid, 13.7 lbs. of technical alkyl naphthalene boiling at 238° to 293° C., 12.3 lbs. of xylene, 11.3 lbs. of isopropanol, 17.7 lbs. of ethylene dichloride, and 5.0 lbs. of a blend of alkylarylsulfonates and alkylphenoxy polyethoxy ethanols.

1.67 lbs. of the concentrate mixed with 20 gals. of water gave a spray emulsion containing 1,000 p.p.m. of N,N-dimethyl-$\alpha,\alpha$-diphenylacetamide and 3,000 p.p.m. of 2,2-dichloropropionic acid.

*Example 2*

A dispersible powder concentrate having the following percentage composition:

| | Percent |
|---|---|
| N,N-diethyl-$\alpha,\alpha$-diphenylacetamide | 20 |
| Sodium 2,2-dichloropropionate | 30 |
| Kaolinite clay (finely divided) | 46 |
| Sodium salt of condensed mononaphthalene sulfonic acid (Lomar D) | 4 | was prepared by mixing 20 g. of N,N-diethyl-$\alpha,\alpha$-diphenylacetamide, 30 g. of sodium 2,2-dichloropropionate, 46 g. of kaolinite clay, and 4 g. of the sodium salt of condensed mononaphthalene sulfonic acid. The mixture was milled to an average particle size of 5 to 30 microns.

*Example 3*

A dispersible powder concentrate having the following percentage composition:

| | Percent |
|---|---|
| N,N-diallyl-$\alpha,\alpha$-diphenylacetamide | 5.8 |
| Sodium 2,2-dichloropropionate | 40 |
| Polymerized sodium salt of substituted benzoid long-chain sulfonic acid (Daxad 27) | 9.2 |
| Kaolinite | 45.0 | was prepared by mixing 31.6 g. of N,N-diallyl-$\alpha,\alpha$-diphenylacetamide, 218 g. of sodium 2,2-dichloropropionate, 50 g. of a polymerized sodium salt of substidudted benzoid long-chain sulfonic acid (Daxad 27), and 245 g. of kaolinite. The mixture was milled to a particle size averaging 5 to 30 microns. It was suspended in 10 gals. of water, giving an aqueous spray containing about 820 p.p.m. of N,N-diallyl-$\alpha,\alpha$-diphenylacetamide and 5680 p.p.m. of sodium 2,2-dichloropropionate.

*Example 4*

A dust formulation having the following percentage composition:

| | Percent |
|---|---|
| N,N-dimethyl-$\alpha,\alpha$-diphenylacetamide | 2.5 |
| Triethanolamine salt of 2,2-dichloropropionic acid | 2.5 |
| Vermiculite (30/60 mesh) | 95 | was prepared by spraying a solution of 150 g. of N,N-dimethyl-$\alpha,\alpha$-diphenylacetamide and 150 g. of the triethanolamine salt of 2,2-dichloropropionic acid in 1,000 ml. of methanol on 5700 g. of vermiculite (30/60 mesh) while the vermiculite was being tumbled and stirred so as to assure even distribution. The methanol was then evaporated, leaving the N,N-dimethyl-$\alpha,\alpha$-diphenylacetamide and the triethanolamine salt of 2,2-dichloropropionic acid adsorbed on the vermiculite. The treated vermiculite was then pulverized to a particle size averaging 5 to 30 microns.

*Example 5*

A granular formulation having the following percentage composition:

| | Percent |
|---|---|
| N-N-dimethyl-$\alpha,\alpha$-diphenylacetamide | 2.2 |
| Ethyl 2,2-dichloropropionate | 1.5 |
| Vermiculite (20/40 mesh) | 96.3 | was prepared by spraying a solution of 131 g. of N,N-dimethyl-$\alpha,\alpha$-diphenylacetamide and 89 g. of ethyl 2,2-dichloropropionate in 1,000 ml. of methylene chloride on 5780 g. of vermiculite (20/40 mesh) while the vermiculite was being tumbled and stirred so as to assure even distribution. The methylene chloride was then evaporated, leaving the N,N-dimethyl-$\alpha,\alpha$-diphenylacetamide and the ethyl 2,2-dichloropropionate adsorbed on the vermiculite.

We claim:
1. The method of preventing germination of plant seeds and controlling growth of plants which comprises contacting said seeds and plants with a herbicidally effective amount of a composition comprising an essential ac- tive ingredient component consisting of 2,2-dichloropropionic acid and N,N-disubstituted-α,α-diphenylacetamide represented by the following structural formula:

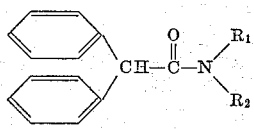

wherein $R_1$ and $R_2$ are selected from the class consisting of alkyl of from 1 to 3 carbon atoms, inclusive, and alkenyl of from 3 to 4 carbon atoms, inclusive, said 2,2-dichloropropionic acid and N,N-disubstituted-α,α-diphenylacetamide being present in a ratio sufficient to attain potentiation of herbicidal activity.

2. Herbicidal composition comprising, as the essential active ingredient component, from 0.25% to 80% of a mixture consisting of 2,2 - dichloropropionic acid and N,N - disubstituted-α,α-diphenylacetamide represented by the following structural formula:

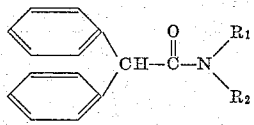

wherein $R_1$ and $R_2$ are selected from the class consisting of alkyl of from 1 to 3 carbon atoms, inclusive, and alkenyl of from 3 to 4 carbon atoms, inclusive, and a dispersible carrier therefor, said 2,2-dichloropropionic acid and N,N-disubstituted-α,α-diphenylacetamide being present in a ratio sufficient to attain potentiation of herbicidal activity.

3. Herbicidal composition comprising, as the essential active ingredient component, from 0.25% to 80% of a mixture consisting of from about 10% to about 90% of 2,2-dichloropropionic acid and from about 90% to about 10% of N,N-disubstituted-α,α-diphenylacetamide represented by the following structural formula:

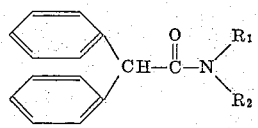

wherein $R_1$ and $R_2$ are selected from the class consisting of alkyl of from 1 to 3 carbon atoms, inclusive, and alkenyl of from 3 to 4 carbon atoms, inclusive, and a dispersible phytonomic carrier therefor.

4. A herbicidal composition comprising, as the essential active ingredient component, from 0.25% to 80% of a mixture of from about 10% to about 90% 2,2-dichloroproponic acid and, correspondingly, from about 90% to about 10% N,N - dialkyl-α,α-diphenylacetamide according to claim 2 and a solid particulate carrier therefor.

5. A herbicidal composition comprising, as the essential active ingredient component, from 0.25% to 80% of a mixture of from about 10% to about 90% 2,2-dichloropropionic acid and, correspondingly, from about 90% to about 10% N,N-dimethyl - α,α - diphenylacetamide and a solid particulate carrier therefor.

6. An emulsifiable concentrate comprising, as the essential active ingredient component, from 5% to 50% of a mixture consisting of from about 10% to about 90% 2,2-dichloropropionic acid and, correspondingly, from about 9 parts to about 1 part N,N-substituted-α,α- diphenylacetamide represented by the following structural formula:

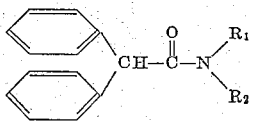

wherein $R_1$ and $R_2$ are selected from the class consisting of alkyl of from 1 to 3 carbon atoms, inclusive, and alkenyl of from 3 to 4 carbon atoms, inclusive, a substantially water-immiscible solvent carrier therefor, and a surfactant.

7. Herbicidal composition comprising, as the essential active ingredient component, from 0.25% to 80% of a mixture consisting of about 50% 2,2 - dichloropropionic acid and about 50% N,N-dimethyl-α,α-diphenylacetamide and a dispersible phytonomic carrier therefor.

8. The method of preventing germination of seeds and controlling growth of plants which comprises contacting said seeds and plants with a herbicidally effective amount of a composition comprising an essential active ingredient component consisting of 2,2-dichloropropionic acid and N,N-dialkyl,α-α-diphenylacetamide according to claim 1, said 2,2-dichloropropionic acid and N,N-dialkyl-α,α-diphenylacetamide being present in a ratio sufficient to attain potentiation of herbicidal activity.

9. The method of preventing germination of seeds and controlling growth of plants which comprises contacting said seeds and plants with a herbicidally effective amount of a composition comprising an essential active ingredient component consisting of 2,2-dichloropropionic acid and N,N-dimethyl-α,α-diphenylacetamide, said 2,2-dichloropropionic acid being present in a ratio of about 10% to about 90% and said N,N- dimethyl-α,α-diphenylacetamide is correspondingly present in a ratio of about 90% to about 10%.

References Cited in the file of this patent
UNITED STATES PATENTS

| 2,642,352 | Barrons | June 16, 1953 |
| 3,063,822 | Soper | Nov. 13, 1962 |

FOREIGN PATENTS

| 581,243 | Canada | Aug. 11, 1959 |
| 589,699 | Canada | Dec. 29, 1959 |

OTHER REFERENCES

Meadows in "Proceedings, Northeastern Weed Control Conference," January 1960, pages 3 to 6 (page 4 of special interest).

UNITED STATES PATENT OFFICE
CERTIFICATE OF CORRECTION

Patent No. 3,152,884                 October 13, 1964

Alan J. Lemin et al.

It is hereby certified that error appears in the above numbered patent requiring correction and that the said Letters Patent should read as corrected below.

Column 6, line 28, for "substitudted" read -- substituted --; column 8, line 7, for "9 parts to about 1 part" read -- 90% to about 10% --; line 48, for "2,642,352" read -- 2,642,354 --.

Signed and sealed this 30th day of March 1965.

(SEAL)
Attest:

ERNEST W. SWIDER
Attesting Officer

EDWARD J. BRENNER
Commissioner of Patents